United States Patent
Blair et al.

(10) Patent No.: US 9,923,773 B2
(45) Date of Patent: Mar. 20, 2018

(54) DYNAMIC, BROKER-BASED VIRTUAL SERVICE PLATFORM (VSP) ENGAGEMENT FOR COMPUTER NETWORKS

(71) Applicant: Cisco Technology, Inc., San Jose, CA (US)

(72) Inventors: Dana L. Blair, Alpharetta, GA (US); Anand Oswal, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 14/730,637

(22) Filed: Jun. 4, 2015

(65) Prior Publication Data
US 2016/0359672 A1 Dec. 8, 2016

(51) Int. Cl.
*H04L 12/24* (2006.01)
*H04L 12/46* (2006.01)
*H04L 12/813* (2013.01)
*H04L 12/911* (2013.01)
*H04L 12/713* (2013.01)
*H04L 12/721* (2013.01)

(52) U.S. Cl.
CPC ...... *H04L 41/0893* (2013.01); *H04L 12/4641* (2013.01); *H04L 45/586* (2013.01); *H04L 45/70* (2013.01); *H04L 47/20* (2013.01); *H04L 47/783* (2013.01); *H04L 47/825* (2013.01)

(58) Field of Classification Search
CPC ... H04L 63/20; H04L 63/102; H04L 63/0272; H04W 12/08; H04W 12/06; G06F 2221/2111; G06F 21/6218; G06F 21/604; G06F 21/72; G06F 21/629
See application file for complete search history.

(56) References Cited

U.S. PATENT DOCUMENTS

| | | | |
|---|---|---|---|
| 7,286,545 B1 | 10/2007 | Tester et al. | |
| 7,593,388 B1 * | 9/2009 | Mitchell | H04L 12/66 370/352 |
| 8,370,917 B1 * | 2/2013 | Hayes | H04L 67/22 713/151 |
| 8,451,837 B1 * | 5/2013 | Schuett | H04L 45/46 370/390 |
| 8,694,616 B2 | 4/2014 | Millefiorini et al. | |
| 9,059,912 B2 * | 6/2015 | Xu | H04L 43/0876 |
| 9,100,201 B1 * | 8/2015 | Pichumani | H04L 12/185 |
| 2005/0071182 A1 | 3/2005 | Aikens et al. | |
| 2006/0048142 A1 * | 3/2006 | Roese | H04L 41/0893 717/176 |
| 2008/0301053 A1 | 12/2008 | Tserkovny et al. | |
| 2009/0254967 A1 * | 10/2009 | J. | H04L 63/20 726/1 |

(Continued)

*Primary Examiner* — Ninos Donabed
(74) *Attorney, Agent, or Firm* — Parker Ibrahim & Berg LLC; James M. Behmke; Stephen D. LeBarron

(57) ABSTRACT

In one embodiment, a device in a network determines one or more network metrics regarding operation of the network. The device determines one or more policy constraints regarding the routing of network traffic through a virtual service platform (VSP). The device generates a VSP usage policy based on the one or more network metrics and on the one or more policy constraints. The VSP usage policy is operable to cause traffic in the network to be routed through a particular VSP that is selected based on the VSP usage policy. The device causes the VSP usage policy to be implemented in the network.

16 Claims, 13 Drawing Sheets

(56) References Cited

U.S. PATENT DOCUMENTS

| | | | |
|---|---|---|---|
| 2011/0258431 A1* | 10/2011 | Gundavelli | H04L 29/12254 713/150 |
| 2012/0151057 A1* | 6/2012 | Paredes | H04L 12/4641 709/225 |
| 2013/0066939 A1 | 3/2013 | Shao | |
| 2013/0086235 A1* | 4/2013 | Ferris | G06F 9/505 709/223 |
| 2013/0097578 A1* | 4/2013 | Motoki | G06F 8/00 717/101 |
| 2013/0133058 A1* | 5/2013 | Hayes | H04L 67/22 726/12 |
| 2013/0195037 A1* | 8/2013 | Gundavelli | H04L 29/12254 370/329 |
| 2014/0109175 A1* | 4/2014 | Barton | H04L 63/0807 726/1 |

* cited by examiner

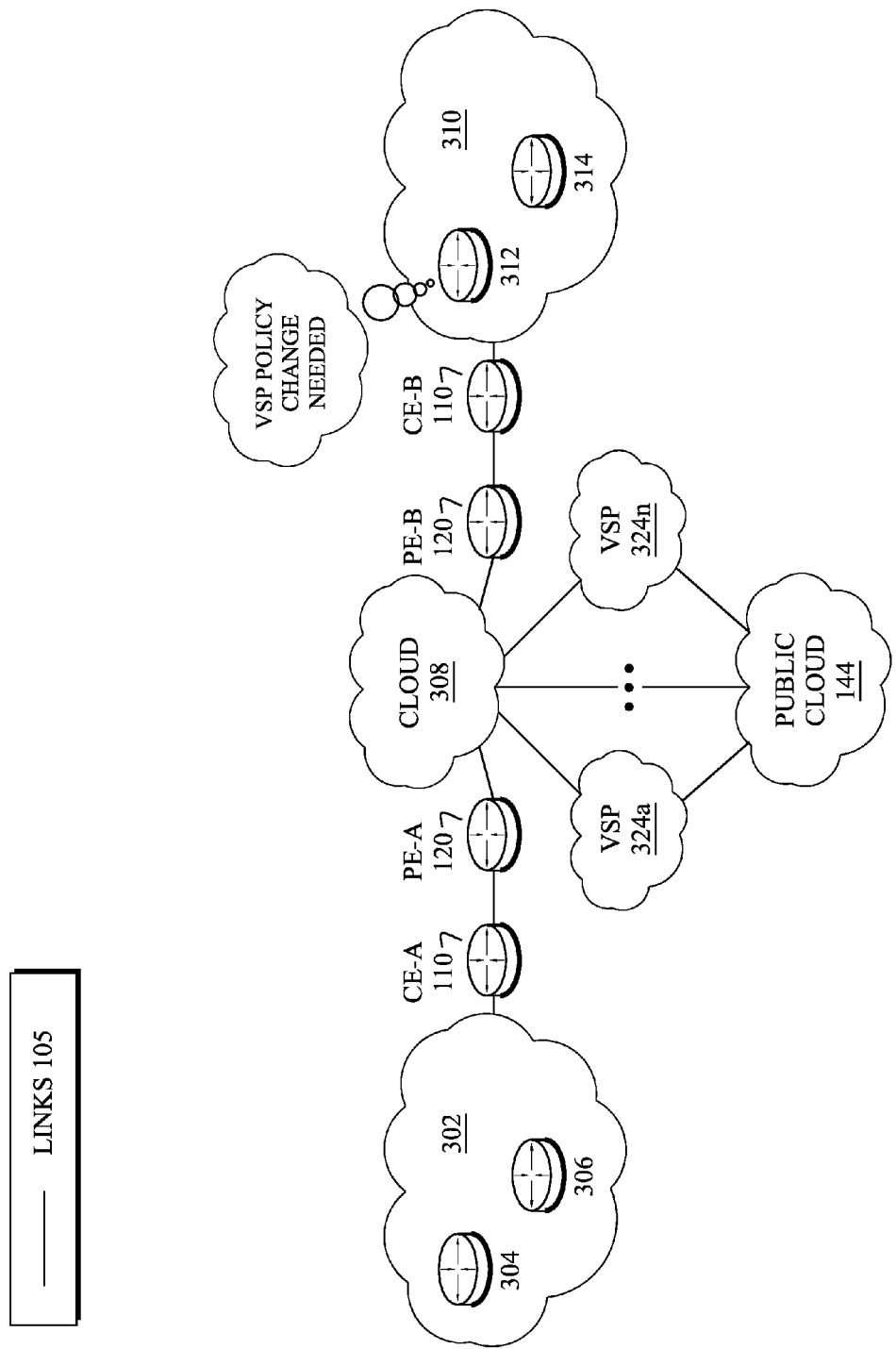

US 9,923,773 B2

DYNAMIC, BROKER-BASED VIRTUAL SERVICE PLATFORM (VSP) ENGAGEMENT FOR COMPUTER NETWORKS

TECHNICAL FIELD

The present disclosure relates generally to computer networks, and, more particularly, to dynamic, broker-based virtual service platform (VSP) engagement for computer networks.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Some enterprise networks are now also leveraging the use of virtual service platforms (VSP). In general, VSPs are virtual entities within a computer network that provide particular traffic services. For example, traffic within the network may be routed through a particular VSP for purposes of performing security functions, caching, analytics, etc. Typically, such traffic is sent via a virtual private network (VPN) tunnel with the VSP.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5B illustrate an example of a VSP broker dynamically adjusting VSP engagement;

DESCRIPTION OF EXAMPLE EMBODIMENTS

Overview

According to one or more embodiments of the disclosure, a device in a network determines one or more network metrics regarding operation of the network. The device determines one or more policy constraints regarding the routing of network traffic through a virtual service platform (VSP). The device generates a VSP usage policy based on the one or more network metrics and on the one or more policy constraints. The VSP usage policy is operable to cause traffic in the network to be routed through a particular VSP that is selected based on the VSP usage policy. The device causes the VSP usage policy to be implemented in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
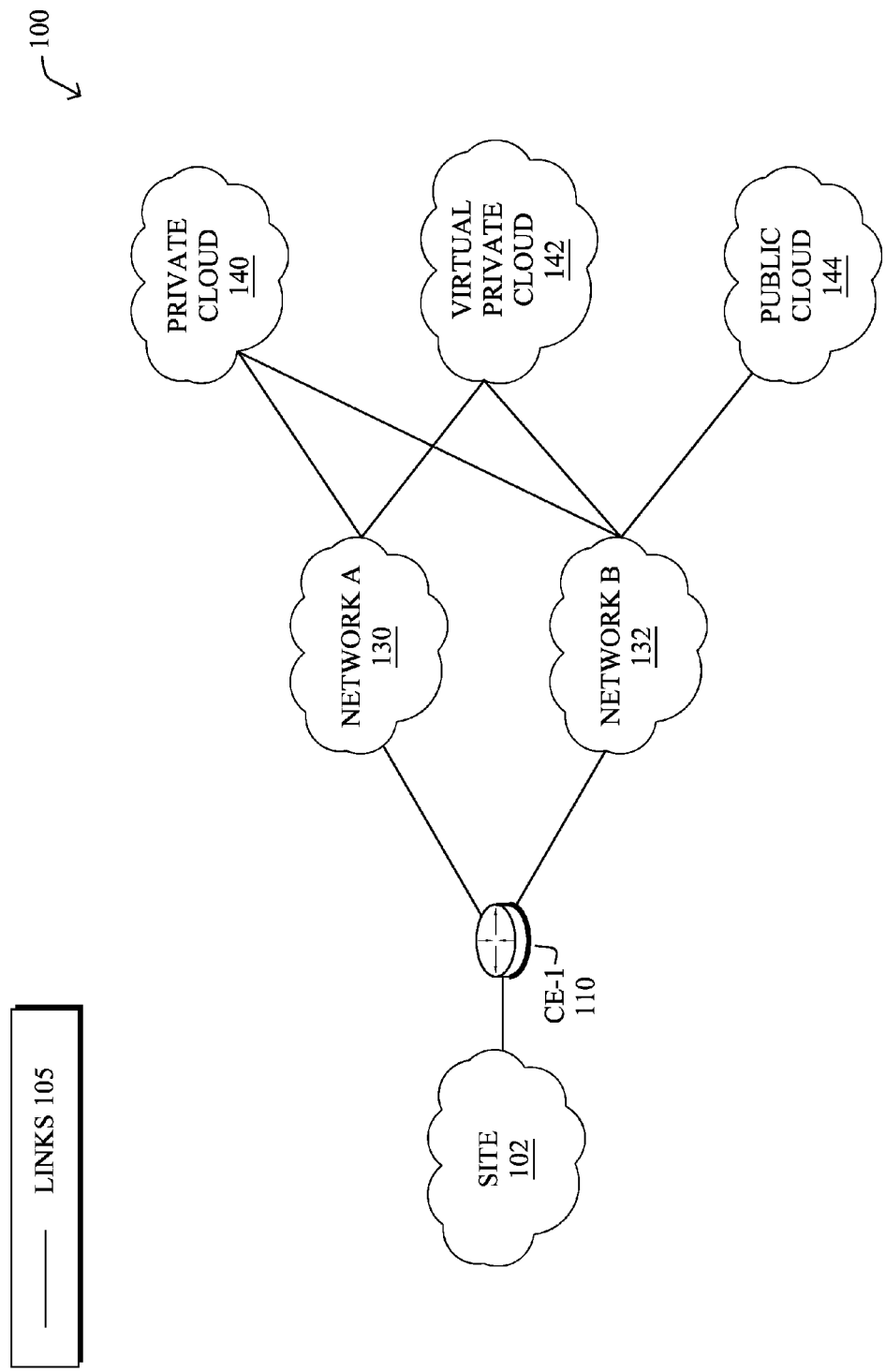
FIG. 1 illustrates an example communication system.

FIG. 1 is a schematic block diagram of an example communication system 100, according to various embodiments. As shown, a site 102 (e.g., a branch of an enterprise network, etc.) may connect the various computing devices located at site 102 (e.g., a LAN of devices) to various remote devices/services via one or more customer edge (CE) routers 110 and links 105. Such remote devices/services may exist within a private cloud 140, a virtual private cloud 142, a public cloud 144, or the like. In general, one or more CE routers 110 (e.g., router CE-1, etc.), may provide connectivity between devices on one or more LANs of site 102 with the devices/services associated with clouds 140-144. For example, public cloud 144 may include a publicly available web server, whereas private cloud 140 may include a server located within a data center operated by the same entity associated with site 102.

Data packets (e.g., traffic/messages) may be exchanged among the nodes/devices of the communication system 100 over links 105 using predefined network communication protocols such as TCP/IP, User Datagram Protocol (UDP), Asynchronous Transfer Mode (ATM) protocol, Frame Relay protocol, or any other suitable protocol. Those skilled in the art will understand that any number of nodes, devices, links, etc. may be used in the system, and that the view shown herein is for simplicity.

A particular site may be connected to clouds 140, 142, and/or 144 via any number of different core networks. For example, as shown, site 102 may be connected to a first network 130 and also to a second network 132, the links to which may exhibit very different network service level agreement (SLA) characteristics. Connections between site 102 and networks 130-132 may comprise, in various embodiments, public Internet connections, multiprotocol label switching (MPLS) networks, or the like. In one embodiment, networks 130, 132 may even be associated with different service providers.

For the sake of illustration, a given site may fall under any of the following categories:

1.) Site Type A: a site connected using a private or virtual private network (VPN) link via a single CE router and a single link, with potentially a backup link (e.g., a 3G/4G/LTE backup connection). For example, CE-1 shown may support site 102 via a link to network 130 (e.g., an MPLS network), potentially also with a backup network connection via a cellular wireless connection.

2.) Site Type B: a site connected using two VPN links (e.g., from different service providers), with potentially a backup link (e.g., a 3G/4G/LTE connection). In one example, dynamic tunneling techniques, such as Dynamic Multipoint Virtual Private Network (DMVPN) by Cisco Systems™ or the like, may be used to dynamically build VPN tunnels over one or more MPLS networks, one or more Internet connections, etc. A site of type B may itself be of different types:

2a.) Site Type B1: a site connected using two MPLS VPN links (e.g., from different service providers), with potentially a backup link (e.g., a 3G/4G/LTE connection). For example, networks 130 and 132 may be different MPLS networks, in one embodiment.

2b.) Site Type B2: a site connected to the network using one MPLS VPN link and one link connected to the public Internet, with potentially a backup link (e.g., a 3G/4G/LTE connection). For example, network 130 may be an MPLS network, whereas the connection to network 132 may be a public Internet connection, potentially also with a cellular wireless backup link.

2c.) Site Type B3: a site connected to the network using two links connected to the public Internet (e.g., via different service providers), with potentially one or more backup links (e.g., a 3G/4G/LTE connection). For example, the connections between CE-1 and both of networks 130, 132 may be public Internet connections via different service providers.

As would be appreciated, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one network while a second CE router is connected to the other network), with potentially one or more backup links (e.g., a wireless 3G/4G/LTE backup link). For example, site 102 may include a first CE router 110 connected to network 130 and a second CE router 110 connected to network 132, in another embodiment.

Any number of devices, configurations, and network connections may be used to provide remote communications to and from a given site. Further, while certain topologies are depicted, such as with a site connected to different service provider networks, other topologies may be used in other embodiments (e.g., site 102 may be connected to three different service provider networks, four different networks, etc.).

Numerous types of application traffic may be flowing through current day networks. For example, a particular CE router 110 located at a customer site may provide and receive different forms of application traffic that is communicated through communication system 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

To ensure that certain degrees of performance are met for the network traffic, the various devices in system 100 may employ any or all of the following mechanisms:

Application Visibility and Control (AVC): this mechanism incorporates into the routing devices application recognition and performance monitoring capabilities traditionally available only as dedicated devices. For example, router CE-1 at site 102 shown may be configured to support AVC. In general, AVC allows application awareness to be built into the network infrastructure, plus visibility into the performance of applications running on the network. AVC also allows for enabling of per-application policy for granular control of application bandwidth usage. A typical AVC implementation may perform the following: application recognition, metrics collection and reporting, and management/control. For example, CE-1 may use the Network Based Application Recognition (NBAR) by Cisco Systems, Inc., or a similar mechanism (e.g., by using deep packet inspection, etc.), to associate traffic flows with specific applications. Collected performance metrics such as packet loss, bandwidth usage, etc., may be associated with the identified applications at the router and then reported to a supervisory device, which may make any number of adjustments to the network, in response. The AVC mechanism may further operate in conjunction with a traffic flow analysis and reporting mechanism operable to distinguish between traffic flows and provide summarized reports to a supervisory device. An example of such a mechanism is NetFlow by Cisco Systems, Inc.

Performance Routing (PfR): this mechanism allows traffic to be automatically switched between multiple paths based on configured thresholds for network attributes such as delay, jitter, and loss. These attributes may be tracked using probes that are generated for each DSCP, source-destination tuple, etc. Also, these configured thresholds are based on the perceived tolerance of applications that are being sent over the network. Once these thresholds are crossed (e.g., if the delay increases from than 50 ms or the jitter increases by 5%), threshold crossing alerts may be sent out based on which the traffic is switched over to alternate and pre-configured paths. Once traffic has been moved, probes may continue to be sent out and after a pre-configured time period, based on the probe measurements, traffic is reverted to the original path. For example, assume that network 130 is an MPLS network and that network 132 provides an Internet connection to site 102. In such a case, CE-1 may use PfR to switch between communicating with a data center in private cloud 140 via networks 130 and 132, depending on the measured characteristics of the network and the policy-defined requirements for the specific network traffic.

These and other mechanisms may be used within a network such as communication system 100 to ensure that certain SLAs are met for a given application. For example, a supervisory application policy infrastructure controller (APIC) may operate as a policy engine that works in conjunction with the monitoring/reporting mechanisms local to the deployed routers, to ensure that traffic for a particular application experiences a desired level of performance.

Figure 2:
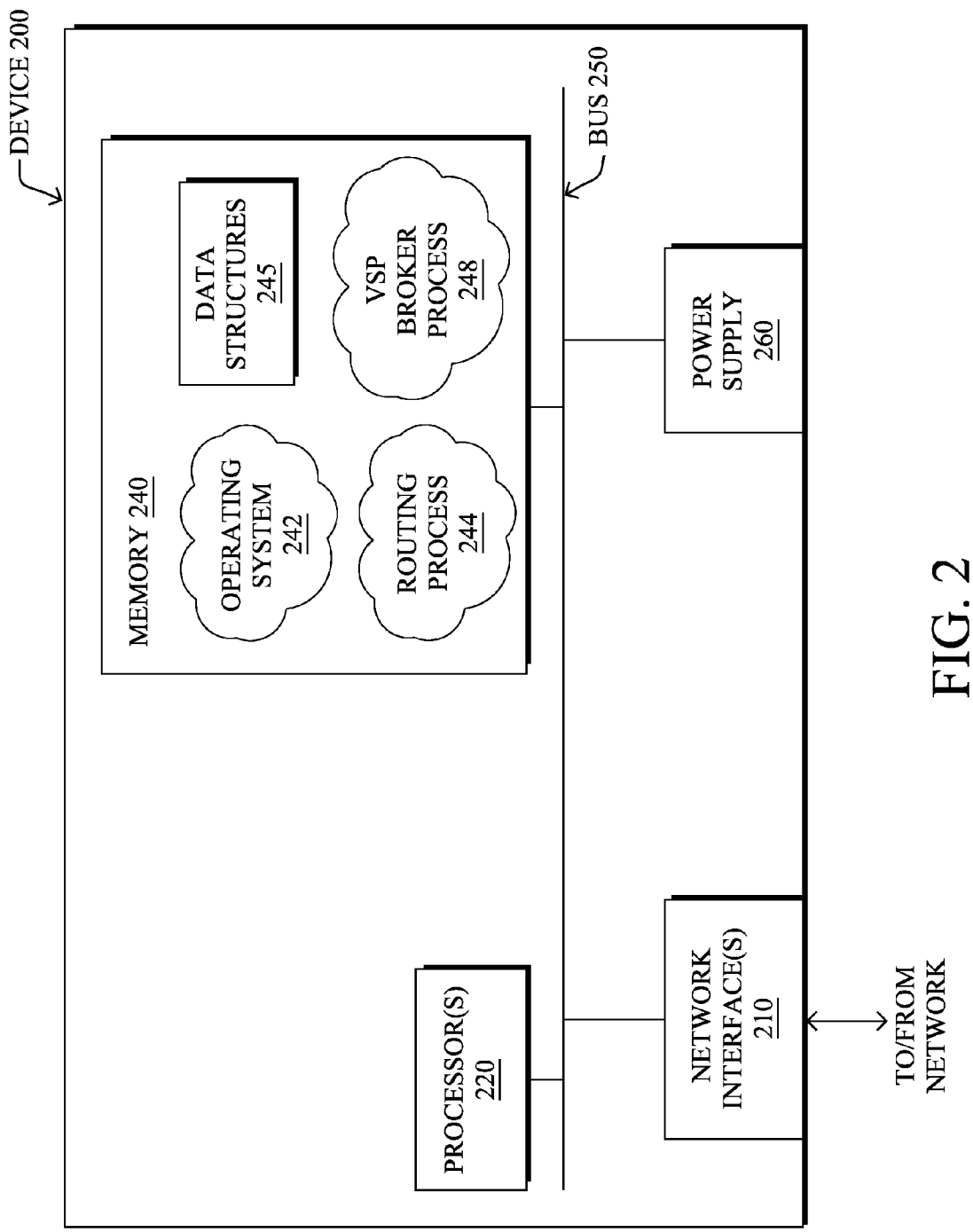
FIG. 2 illustrates an example network device/node.

FIG. 2 is a schematic block diagram of an example node/device 200 that may be used with one or more embodiments described herein, e.g., as any of the devices associated with system 100 (e.g., a router, switch, etc.), any other computing device that supports the operations of system 100 (e.g., servers, network controllers, etc.), or any of the other devices referenced below. The device 200 may also be any other suitable type of device depending upon the type of network architecture in place. Device 200 generally comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the communication system 100. The network interfaces may be configured to transmit and/or receive data using a variety of different communication protocols. Notably, a physical network interface 210 may also be used to implement one or more virtual network interfaces, such as for VPN access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a virtual service platform (VSP) broker process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining a VRF instance, or tunneling protocols, such as for MPLS, generalized MPLS (GMPLS), etc., each as will be understood by those skilled in the art. In one embodiment, routing process 244 may be operable to establish dynamic VPN tunnels, such as by using a DMVPN overlay onto the network.

Routing process/services 244 may further be configured to perform additional functions such as security functions, firewall functions, AVC or similar functions, reporting and/or monitoring functions, PfR or similar functions, combinations thereof, or the like. As would be appreciated, routing process/services 244 may be configured to perform any of its respective functions independently or in conjunction with one or more other devices. In other words, in some cases, device 200 may provide supervisory control over the operations of one or more other devices. In other cases, device 200 may be controlled in part by another device that provides supervisory control over the operations of device 200.

In general, VSP broker process 248 when executed by processor(s) 220 may be operable to enforce a VSP usage policy by device 200 and/or one or more other devices in the network. Notably, various VSPs may exist to perform different services with respect to network traffic. For example, some VSPs may perform security operations on network traffic (e.g., attack detection and mitigation, etc.), caching operations (e.g., providing cached content, thereby decreasing content delivery times), traffic analytic functions, or the like. Such a VSP usage policy may be used to control which traffic is routed through a particular VSP and under what conditions. When executed by a router or other networking device used to send traffic through the network, VSP broker process 248 may receive a VSP usage policy from another device that generates the policy (e.g., a VSP broker executing a corresponding VSP broker process 248). In other embodiments, VSP broker process 248 may be operable to locally generate and implement a VSP usage policy.

Figure 3:
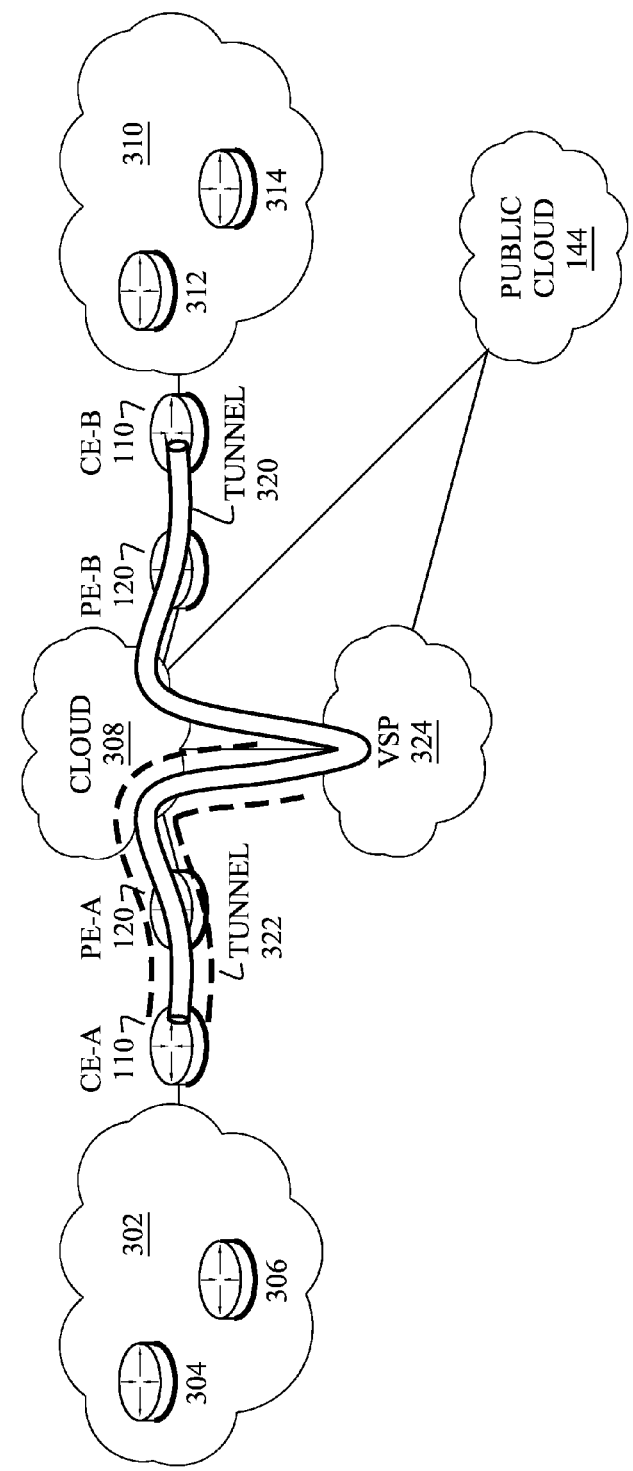
FIG. 3 illustrates an example of a virtual service platform (VSP) being engaged.

Referring now to FIG. 3, an example is shown of a VSP being engaged, according to various embodiments. As noted above, VPN tunnels may be created between separate network domains, such as a local domain and a remote domain. As shown, assume that a first networking domain 302 includes any number of computing devices 304-306 that are addressed within domain 302. For example, domain 302 may be located at a network branch/site (e.g., site 102, etc.), data center or cloud environment, or the like. Similarly, remote domain 310 may include devices 312-314 that are addressed on domain 310.

CE routers 110 may facilitate inter-domain communications between the devices of domains 302 and 310. For example, domain 302 may have one or more CE routers 110 (e.g., router CE-A) in communication with one or more provider edge (PE) routers 120 (e.g., a router PE-A) of a provider network (e.g., network 130, network 132, etc.). Similarly, domain 310 may have one or more CE routers 110 (e.g., router CE-B) in communication with one or more PE routers 120 (e.g., PE-B). PE routers 120 may be communicatively connected via a cloud/network 308. As would be appreciated, network 308 may be operated by the same service provider as that of PE-A and PE-B or may span networks operated by multiple service providers (e.g., CE-A and CE-B are connected via the Internet through different Internet service providers, etc.).

As shown, tunnel 320 may be established between CE-A and CE-B via which communications between domains 302 and 310 may be sent. For example, tunnel 320 may be a DMVPN multipoint, bi-directional tunnel or any other form of tunnel (e.g., IPSEC, etc.) between domains A and B, in either or both directions.

In some cases, a network may also engage one or more VSPs to process traffic between domains. In general, VSPs are virtual entities within a computer network that provide particular services, such as security, caching, analytics, etc. Typically, a network administrator for a VPN contracts with a VSP (e.g., Akamai™, etc.) to route all traffic (or certain subsets of traffic) through the VSP (e.g., through one or more routers of the VSP), to have certain services performed on the traffic. In an example arrangement, a tunnel (e.g., DMVPN) is established from one or more VPN sites to traverse the VSP, either in particular directions or else in every direction between sites.

In one example of a VSP being used, assume that some or all of the traffic communicated between domains 302 and 310 are to be send via a VSP 324 (e.g., for purposes of performing caching operations, security operations, etc.). In such cases, the initial tunnel 320 may be established first between domains 302 and 310, as described above. Once established, a second, redirecting tunnel 322 (e.g., an IPSEC tunnel, etc.) may be established between CE-A and VSP 324. In other words, the initial tunnel 320 between domains 302 and 310 may be encapsulated within a second tunnel 322 that directs the traffic of tunnel 320 through VSP 324, thereby allowing VSP 324 to perform its corresponding service (e.g., security, caching, etc.).

In response to receiving a tunnel-in-tunnel packet from CE-A, the receiving device associated with VSP 324 (e.g., a CE router 110) may decapsulate the packet from the outer tunnel (e.g., tunnel 322), to reveal the packet still encapsulated for the inner tunnel 320. The device may then process the decapsulated traffic, which is still encapsulated for tunnel 320, and forward the traffic along to the destination of tunnel 320 (e.g., CE-B).

In yet another example, consider the case in which VSP 324 is an IPv6 VSP and the Internet service provider (ISP) that operates PE-A only supports IPv4. In such a case, CE-A may encapsulate its IPv6 traffic within an IPv4 tunnel to VSP 324, to access IPv6 services available via public cloud 144 (e.g., the Internet).

When multiple VSP services are required or are available, it is up to the administrator to select corresponding VSPs in advance, and such selection can be burdensome and limiting. For instance, knowing which VSP provides the best or most relevant service can be a time-consuming endeavor, while selecting multiple VSPs for multiple services increases the time and effort necessary to establish the appropriate relationships. Also, if network demands are changing or otherwise dynamic, whether short-term or long-term, the static contractual arrangements with VSPs and the corresponding network configurations may be overly limiting or else under-utilized.

Dynamic, Broker-Based VSP Engagement

The techniques herein provide for the dynamic brokering of the relationships between administered networks and VSPs, thereby facilitating on-demand VSP engagement and disengagement, to reduce the overuse or underuse of VSP services. In some aspects, policy monitoring and enforcement may be used to dynamically engage VSPs for VPN sites based on real-time traffic needs, network changes, policy changes, etc.

Specifically, according to one or more embodiments, a device in a network determines one or more network metrics regarding operation of the network. The device determines one or more policy constraints regarding the routing of network traffic through a virtual service platform (VSP). The device generates a VSP usage policy based on the one or more network metrics and on the one or more policy constraints. The VSP usage policy is operable to cause traffic in the network to be routed through a particular VSP that is selected based on the VSP usage policy. The device causes the VSP usage policy to be implemented in the network.

Illustratively, the techniques described herein may be performed by hardware, software, and/or firmware, such as in accordance with the VSP broker process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols and as such, may be processed by similar components understood in the art that execute those protocols, accordingly.

Operationally, the techniques herein add a layer of abstraction between network administrators and the VSPs through a brokerage function. In particular, the technique provides brokering devices (e.g., a central controller, etc.) that takes customer intent (e.g., policy constraints) and converts it into appropriate VSP engagements, when and as needed. The brokering device may also participate in policy monitoring and enforcement by selectively engaging and disengaging VSPs, in order to meet constraints/policies (e.g., SLAs) on-demand.

Figure 4A:
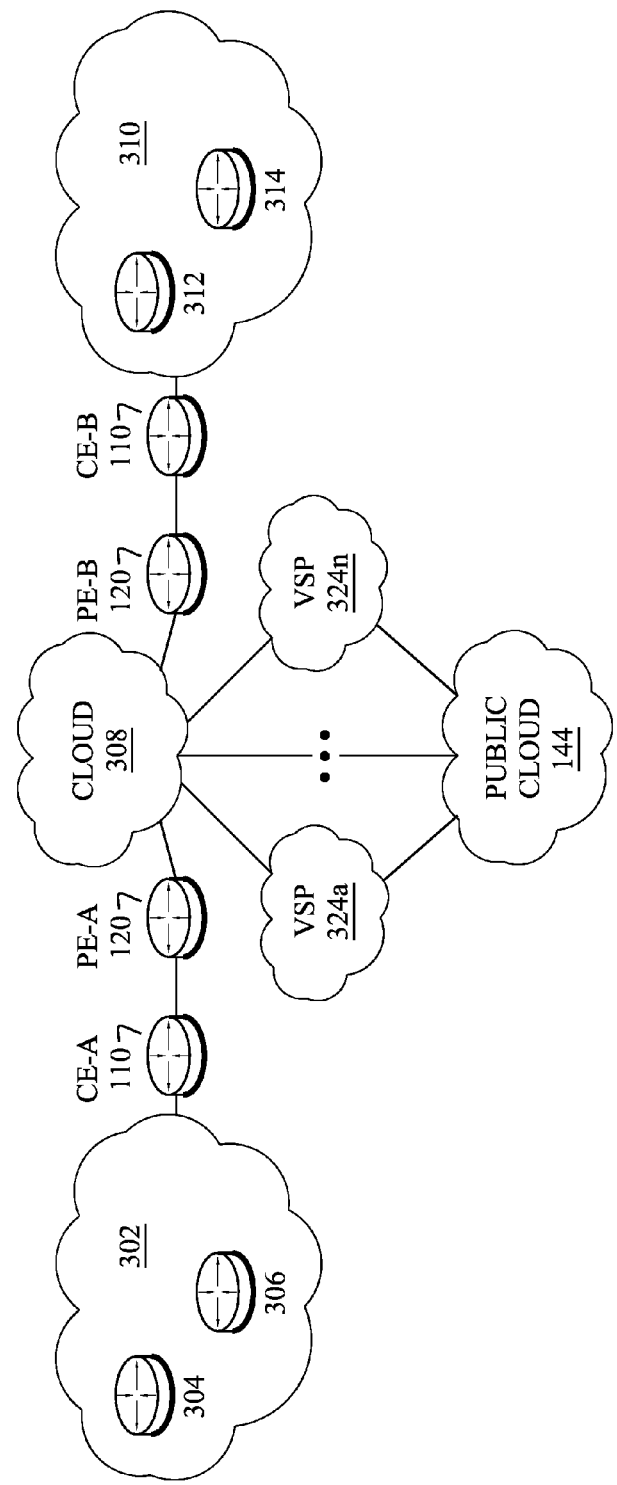
FIGS. 4A-4G illustrate examples of a VSP broker controlling VSP engagements.

FIGS. 4A-4G illustrate examples of a broker controlling VSP engagements, according to various embodiments. As noted previously, one or more VSPs may be engaged to perform services for traffic to and/or from a given site. For example, as shown in FIG. 4A, CE-A may engage any number of VSPs 324a-324n (e.g., a first through nth VSP) to process traffic associated with domain 302, in one or both directions. For example, assume that VSP 324a provides denial of service (DoS) attack protection while VSP 324n may provide content caching services.

Figure 4B:
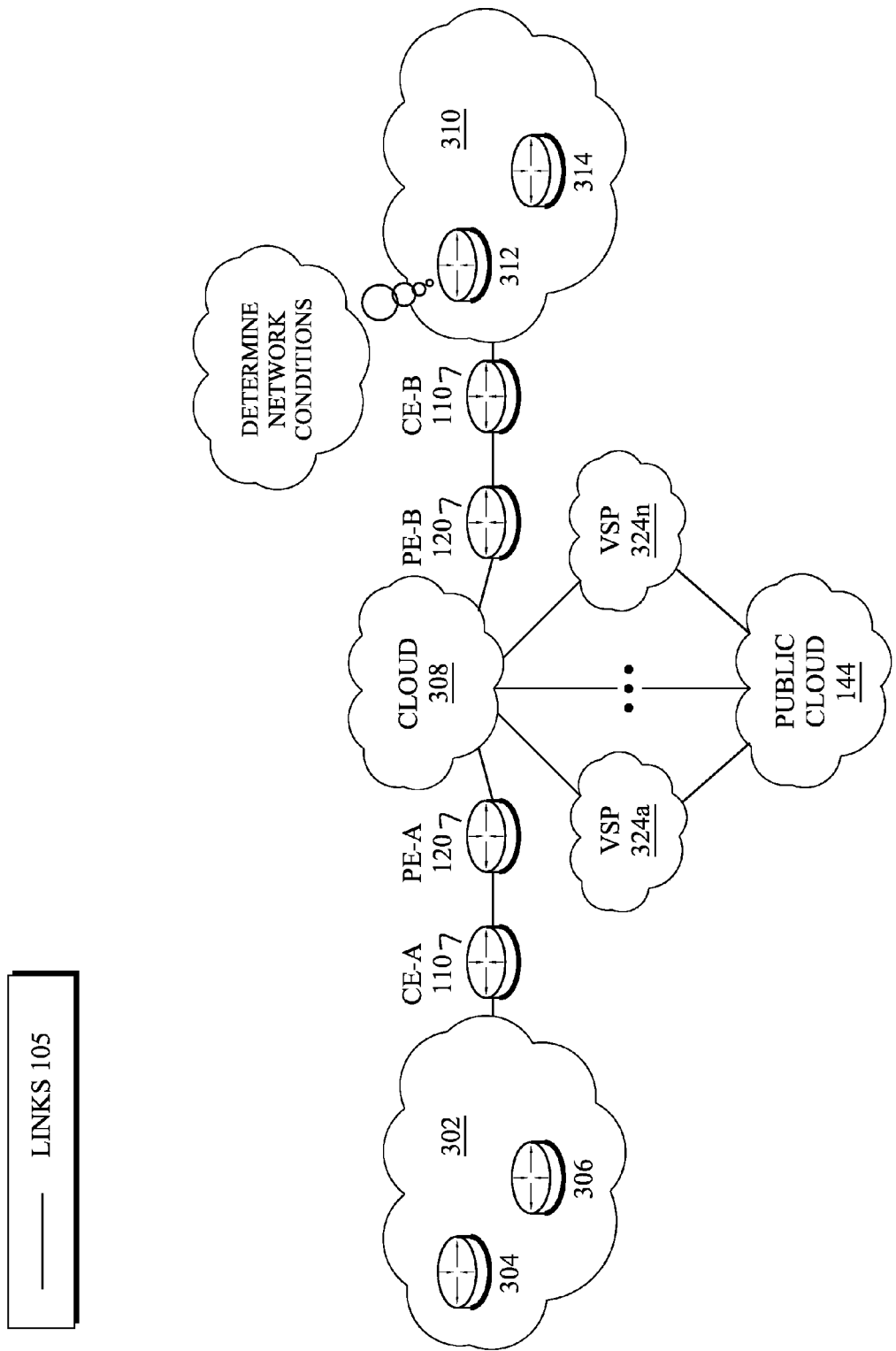

As shown in FIG. 4B, a VSP broker (e.g., device 312) may be operable to generate and/or adjust a VSP usage policy for use by one or more routers in the network to select a particular one or more of VSPs 324a-324n to send traffic. In some embodiments, VSP broker/device 312 may base the VSP usage policy in part on the observed state of the network and/or any physical constraints on the network. Notably, since VSP broker 312 is not providing physical access to the network, it may consider network metrics such as the upstream bandwidth, downstream bandwidth, variations in the upstream and/or downstream bandwidths, costs associated with certain network links (e.g., a service provider may charge a flat rate for X gigabytes per month and an overage charge beyond that, etc.), measurements regarding the network traffic, or any other information indicative of the operating conditions of the network. In one embodiment, VSP broker 312 may receive the network condition information via PfR, AVC, or similar mechanisms employed by one or more routers in the network.

Figure 4C:
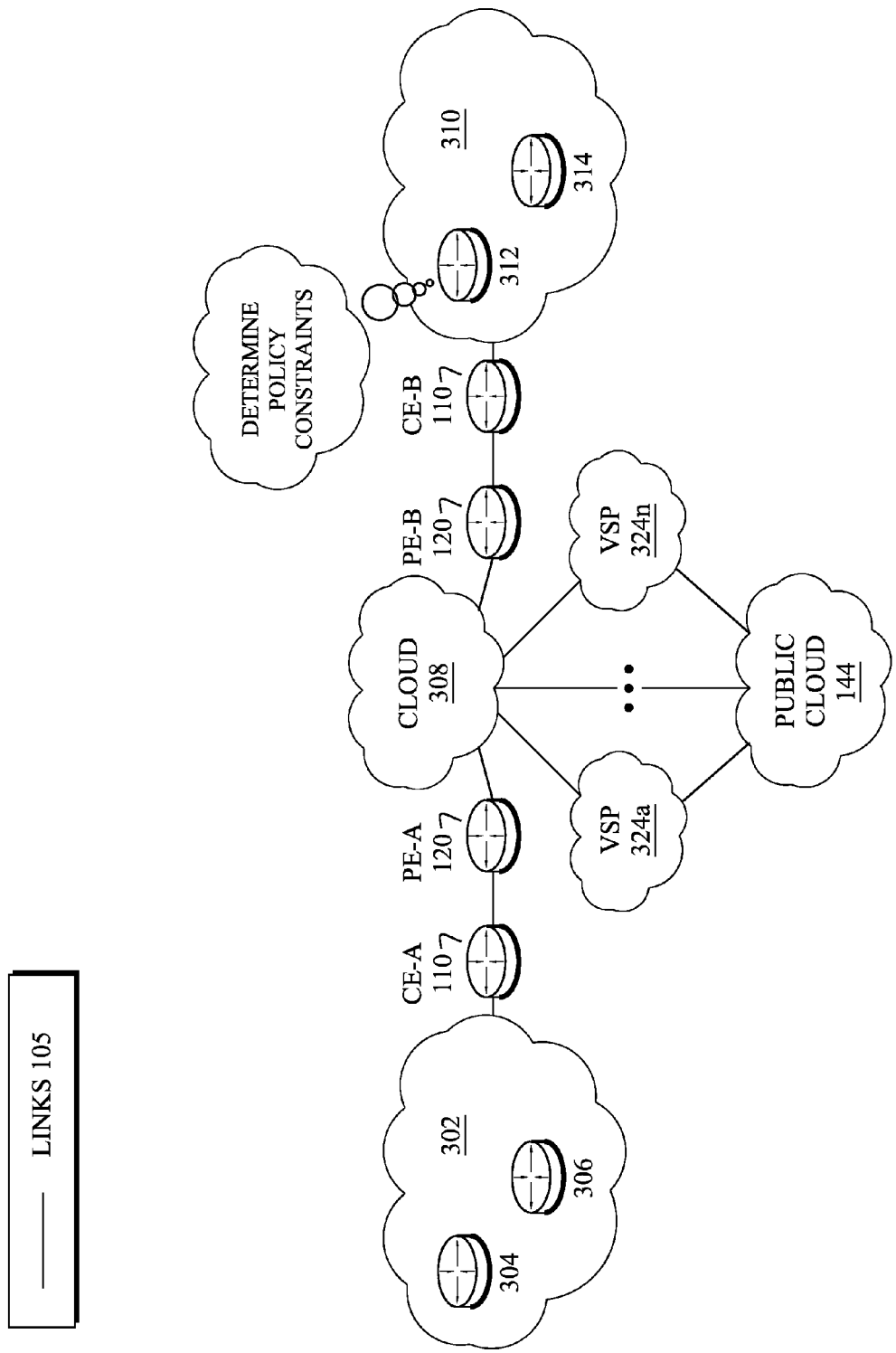

As shown in FIG. 4C, VSP broker 312 may base a VSP usage policy in part on one or more policy constraints, according to various embodiments. In some cases, a policy constraint may be received by VSP broker 310 via a user interface (e.g., a webpage, stand-alone application, etc.). For example, a network administrator may provide constraints to VSP broker 312 regarding cost, geography, ownership (e.g., the operating entity of a VSP), past performance, traffic SLAs, types of traffic to be sent through a VSP, combinations thereof, or any other constraints that may be used by VSP broker 312 to generate a VSP usage policy.

Figure 4D:
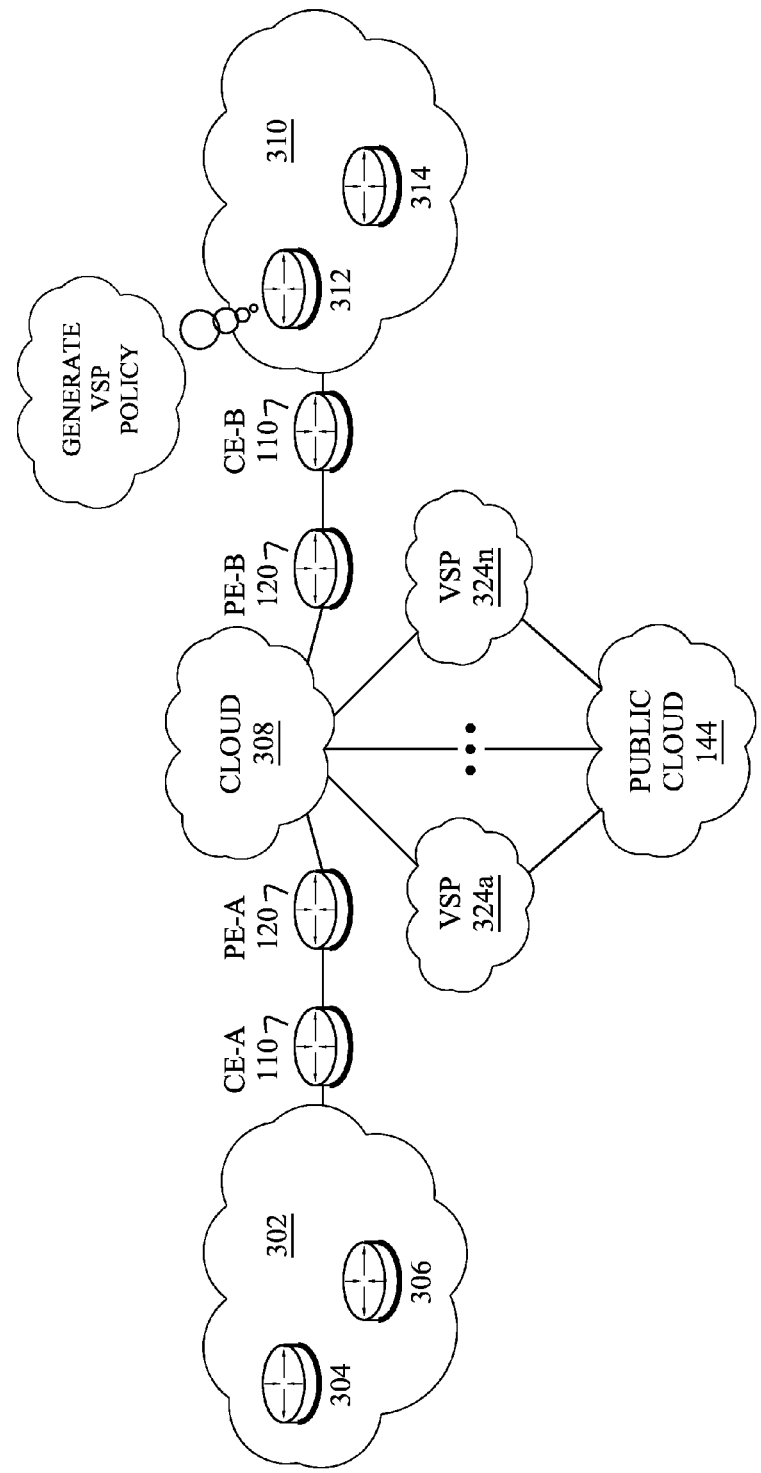

As shown in FIG. 4D, VSP broker 312 may generate a VSP usage policy based on the conditions of the network and/or any policy constraints received by VSP broker 312, in various embodiments. In one embodiment, VSP broker 312 may provide the VSP policy to a user interface, before causing the policy to be implemented. For example, VSP broker 312 may allow a network administrator to approve or disapprove some or all of the generated policy, prior to implementation of the policy (e.g., the administrator may be given the opportunity to approve or disapprove a particular VSP, etc.). In another embodiment, VSP broker 312 may cause the policy to be implemented, so long as the generated policy satisfies all of the specified policy constraints. If VSP broker 312 is unable to generate a VSP usage policy that satisfies the policy constraints, VSP broker 312 may provide a notification to the user interface, to notify the network administrator that VSPs cannot be found to satisfy all of the specified policy constraints. In another embodiment, VSP broker 312 may continually analyze the specified constraints and network conditions, to predict when the constraints are not likely to be met. If such a condition is predicted to exist at some point in the future, VSP broker 312 may provide an alert to the user interface, to allow the network administrator to re-negotiate with the broker or find an alternative outside of the broker.

If the generated VSP usage policy is deemed acceptable, either manually by the network administrator or automatically by VSP broker 312 (e.g., based on the policy meeting the specified constraints), VSP broker 312 may coordinate the use of one or more VSPs associated with the generated policy. Notably, VSP broker 312 may provide any information needed to the operator of the corresponding VSP(s), so that a given customer may begin routing traffic through the VSP(s). For example, VSP broker 312 may provide account information, network information, etc. to the operator of the VSP, to enable the use of the VSP. Such information may be received by VSP broker 312 via a user interface (e.g., as specified by a network administrator or the like).

Figure 4E:
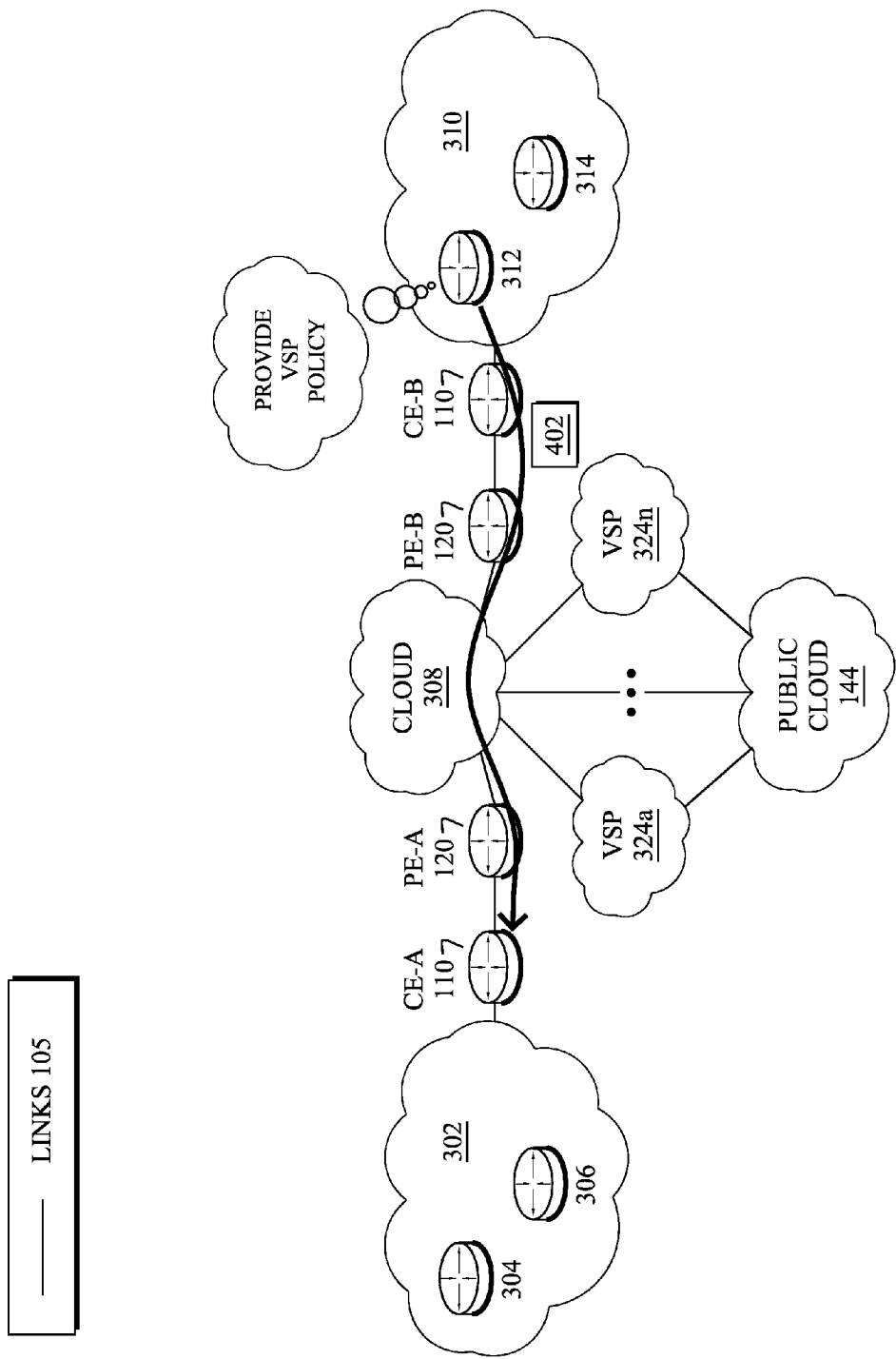

As shown in FIG. 4E, VSP broker 312 may provide the generated VSP usage policy 402 to one or more routers or other networking devices (e.g., router CE-A, etc.). In general, VSP usage policy 402 may be operable to cause a router in the network to route traffic through a particular VSP that is selected based on VSP usage policy 402. Said differently, VSP usage policy 402 may define which, if any, of VSPs 324a-324n are to process traffic associated with domain 302 and under what circumstances. For example, VSP usage policy 402 may dictate which types of traffic are to be routed through a particular VSP (e.g., based on the traffic or application type, based on the source and/or destination of the traffic, etc.) and/or the conditions under which the traffic is to be routed through the particular VSP (e.g., based on a scheduled time, a cost or budget, in response to a detected event, etc.).

Figure 4F:
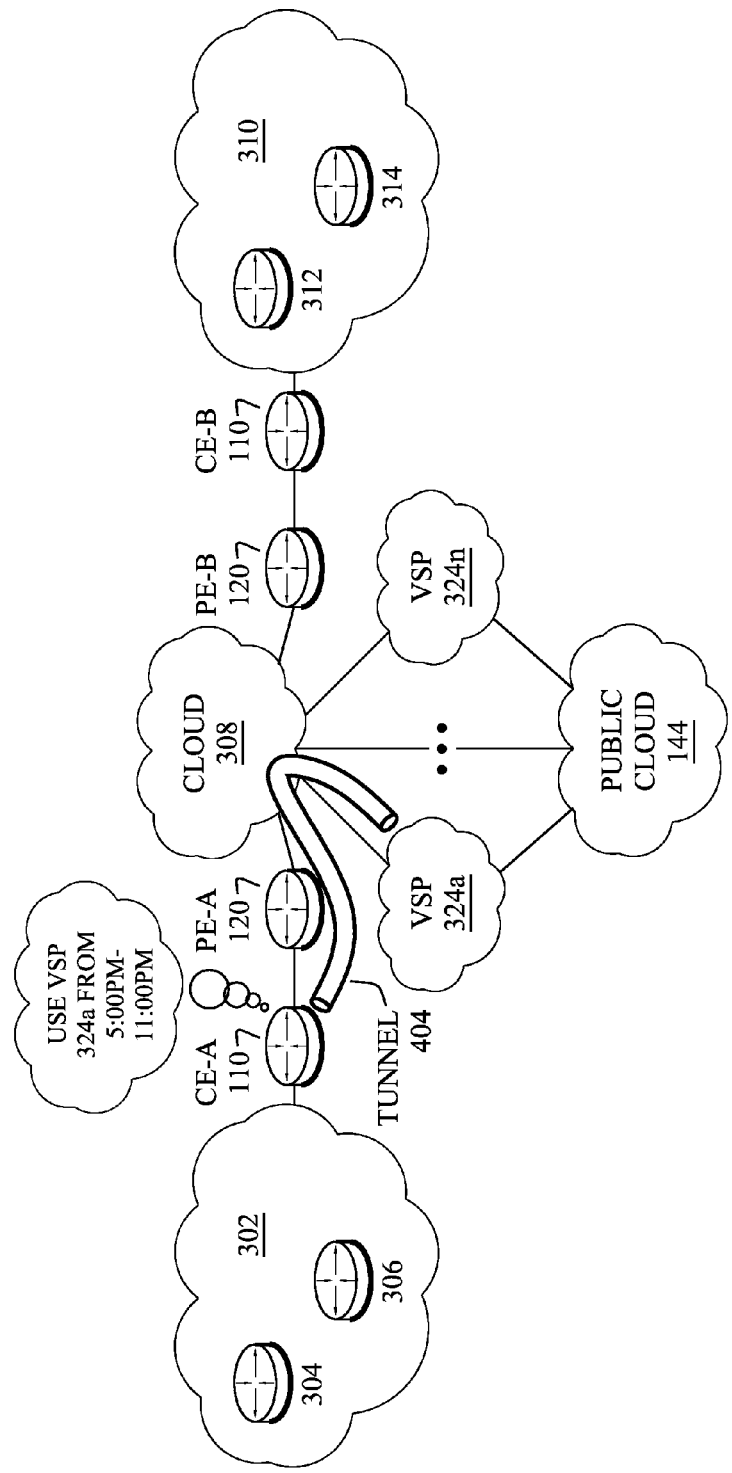

FIG. 4F illustrates an example of router CE-A selecting a particular one of VSPs 324a-324n to send traffic, according to one embodiment. As shown, assume that VSP 324a provides content caching services and that VSP 324n provides DoS attack detection and mitigation services. In one example, assume that a majority of the cacheable content that is accessed by devices 304-306 is accessed between 5:00 PM and 11:00 PM (e.g., content that may be directly accessible from public cloud 144 or a cached copy provided by VSP 324a). In such a case, VSP broker 312 may analyze this information to generate a VSP usage policy that causes CE-A to establish a tunnel 404 with VSP 324a and route all traffic requests for the content to VSP 324a during this time. Outside of the times specified in the VSP usage policy, CE-A may instead route the content requests to the original content providers in public cloud 144.

Figure 4G:
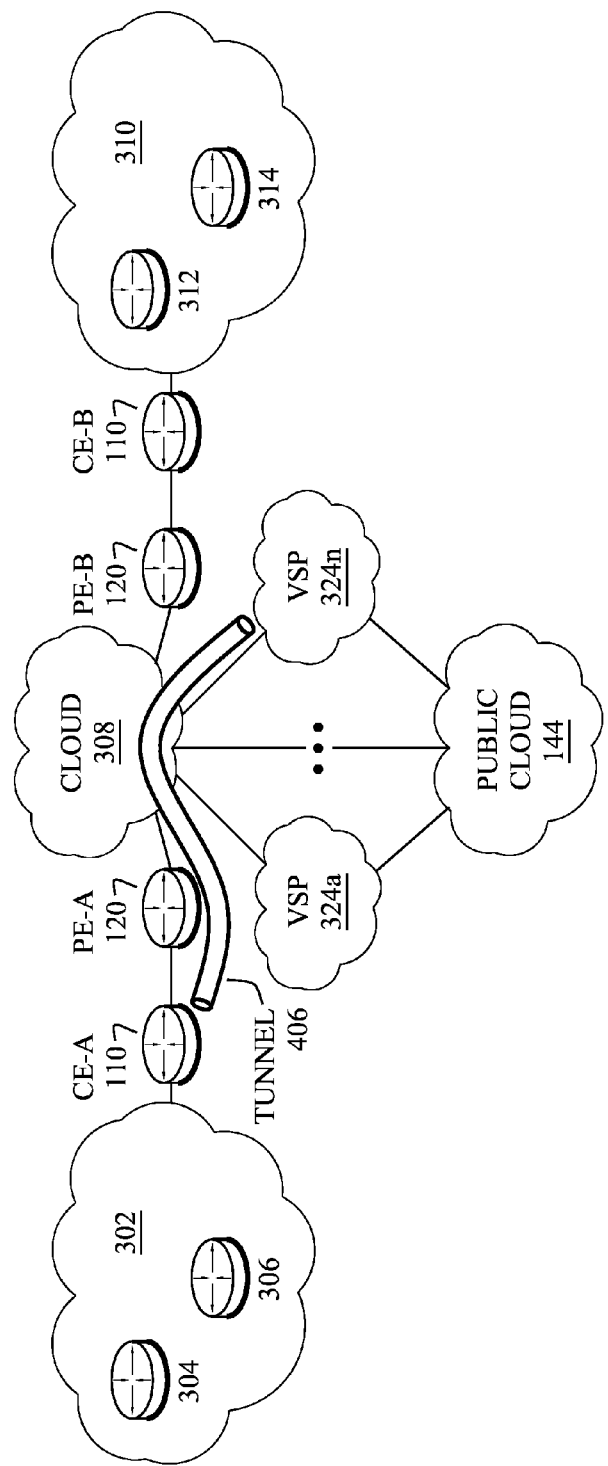

FIG. 4G illustrates another example of router CE-A selecting a VSP to use, based on the VSP usage policy provided to CE-A. As shown, assume that VSP broker 312 detects a traffic anomaly in the traffic associated with domain 302. In such a case, the VSP usage policy implemented by CE-A may cause CE-A to establish a tunnel 406 with VSP 324n, so that all traffic may be sent via tunnel 406 through VSP 324n for further analysis and mitigation. In a further embodiment, CE-A may be configured to detect a traffic anomaly itself and, based on a predefined VSP usage policy, initiate the use of VSP 324n.

According to various other embodiments, traffic may instead be provided directly to VSP broker 312, which may make implement the VSP usage policy. For example, CE-A may send its traffic to VSP broker 312, a virtual or cloud service, or the like, which may, in turn, select which VSP(s) to send the traffic.

In some cases, a VSP broker may apply a tiered service structure for its brokerage services. For example, certain networks may be given access to premier VSPs, while other networks may be forced to engage with discount VSPs based on a service agreement with the broker. In such a case, top-level customers may have more access to high-speed VSPs or VSPs that offer a higher degree of functionality, while mid-level customers of the broker may not have the same level of access.

Figure 5B:
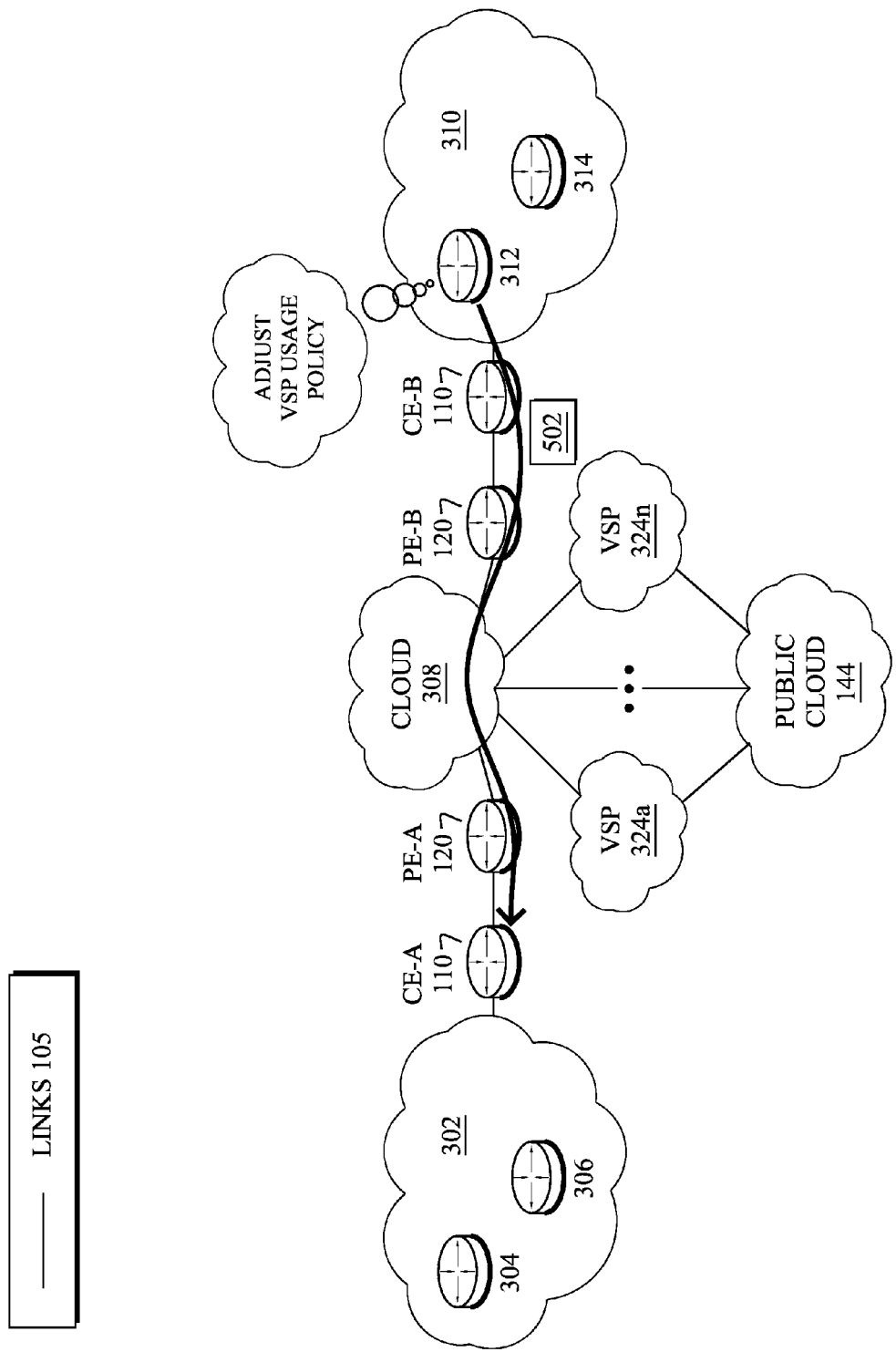

In some embodiments, VSP usage policy enforcement may be dynamically adjusted. For example, as shown in FIGS. 5A-5B, VSP broker 312 may monitor the performance and state of the network, to determine whether a VSP usage policy change is needed. Example network changes that may warrant a policy change may include, but are not limited to, network performance changes (e.g., a slowdown is detected, etc.), traffic pattern changes, SLA or other policy constraint changes, budget or pricing changes, the addition or removal of a given SLA from the brokerage service, combinations thereof, or the like. In one embodiment, VSP broker 312 may adjust a VSP usage policy, in an attempt to ensure that a particular VSP is not overused nor is the VSP underused.

As shown in FIG. 5B, VSP broker 312 may provide an adjusted VSP usage policy 502 to the one or more routers that implement the policy, in some embodiments. For example, as shown, VSP broker 312 may generate a new policy or a policy update and install the policy onto CE-A. Policy adjustments may be made at any time such as periodically (e.g., VSP broker 312 may adjust the VSP usage policy every day, week, month, etc.) or in response to a detected change in the network (e.g., a configuration/constraint change, changing traffic patterns, changing performance characteristics, anomalous traffic behavior, etc.).

As would be appreciated, while the techniques herein may be used to select the use of one or more VSPs, the techniques may also be adapted to select the use of physical service providers (e.g., ISPs, wireless carriers, etc.). For example, assume that a high bandwidth service is available over wireless to domain 302 and that multiple such providers operate in the same location. In such a case, broker 312 may engage not only with VSPs 324a-324n, but also with the corresponding wireless service providers in a similar manner. In a similar manner to the brokering of VSP usage, broker 312 may generate a policy that causes router CE-A or another wireless router associated with domain 302 to select among wireless carriers for use. In doing so, this may alleviate the need for the network administrator to manage the local wireless service provider.

Figure 6:
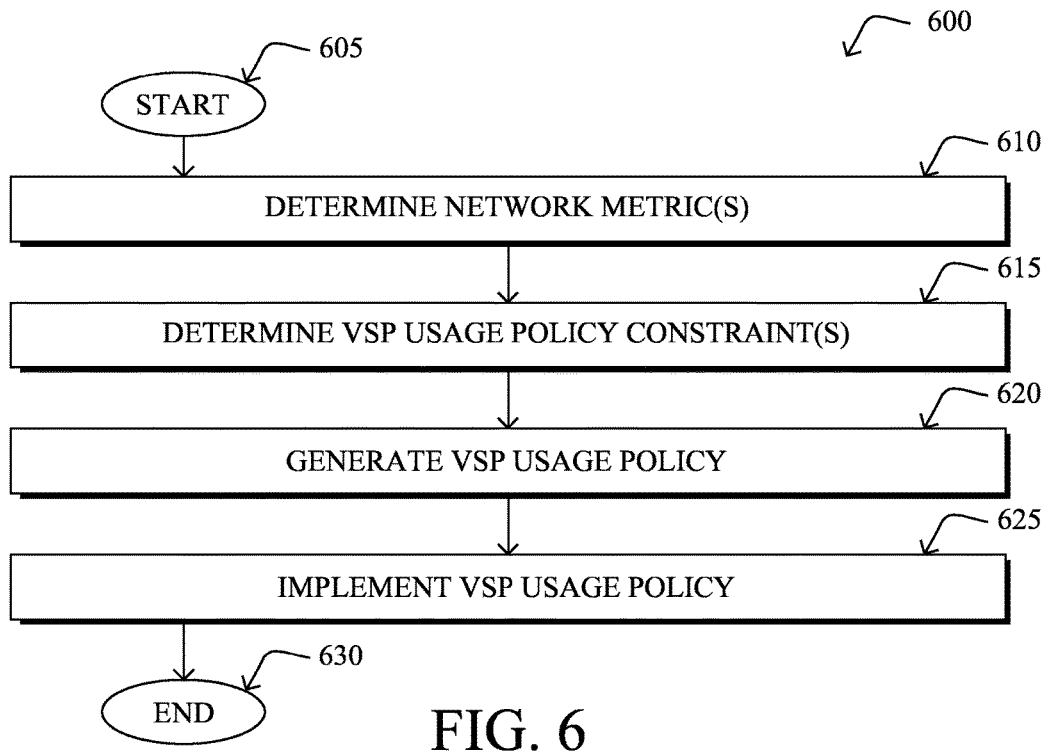
FIG. 6 illustrates an example simplified procedure for implementing a VSP usage policy.

Referring now to FIG. 6, an example simplified procedure for implementing a VSP usage policy is shown, according to various embodiments. Procedure 600 may be performed by any computing or networking device (e.g., device 200) executing a VSP broker process (e.g., VSP broker process 248) to implement a VSP usage policy in the network. Procedure 600 may begin at step 605 and continue on to step 610 where, as described in greater detail above, the device may determine one or more network metrics regarding the network. Example network metrics may include, but are not limited to, available bandwidth(s), used bandwidth(s), variation in the available or used bandwidth, traffic volumes, traffic patterns and other traffic-related information (e.g., geographic locations of sources and/or destinations, etc.), available service provider networks (e.g., wireless, ISPs, etc.), usage terms for one or more service providers (e.g., data usage costs, etc.), SLAs, PfR or AVC information, information regarding VSPs (e.g., metrics, available services, terms of use, etc.), combinations thereof, or the like.

At step 615, the device may determine one or more VSP usage policy constraints, as detailed above. In general, the VSP usage policy constraints may correspond to any information that may be used to control how and when traffic should be routed via one or more VSPs. In one embodiment, the one or more VSP usage policy constraints may be received via a user interface (e.g., as specified by a network administrator or other authorized user). Example VSP usage policy constraints may include, but are not limited to, a geographic region associated with a particular VSP (e.g., traffic originating from a particular geographic area should be routed through the VSP), an operator or other indication that a particular VSP has been approved or disapproved for use, a time period associated with a particular VSP (e.g., based on existing or expected traffic patterns, etc.), a type of traffic associated with a particular VSP (e.g., all content requests are to be routed to the VSP, etc.), a maximum budget or other cost for using VSPs, combinations thereof or the like.

At step 620, as described in greater detail above, the device may generate a VSP usage policy based on the network metric(s) of step 610 and/or the policy constraint(s) of step 615. In particular, the device may generate a VSP usage policy that causes some or all traffic (e.g., traffic of a particular type or application, traffic between specific endpoints, etc.) to be routed through a particular VSP that is selected based on the VSP usage policy. Notably, the VSP usage policy may control through which VSP, if any, traffic is to be routed through and under which conditions. For example, the VSP usage policy may cause one or more routers to establish a VPN tunnel to a particular VSP and send all traffic of a certain type through the VSP. In another example, the VSP usage policy may cause the router to send traffic through the particular VSP only during certain times of the day.

At step 625, the device may cause the VSP usage policy to be implemented in the network, as detailed above. In one embodiment, the device may send the VSP usage policy to one or more routers in the network, to begin implementation of the policy. In another embodiment, the device may itself receive the traffic and, based on the generated VSP usage policy, send the received traffic through a selected VSP. Procedure 600 then ends at step 630.

Figure 7:
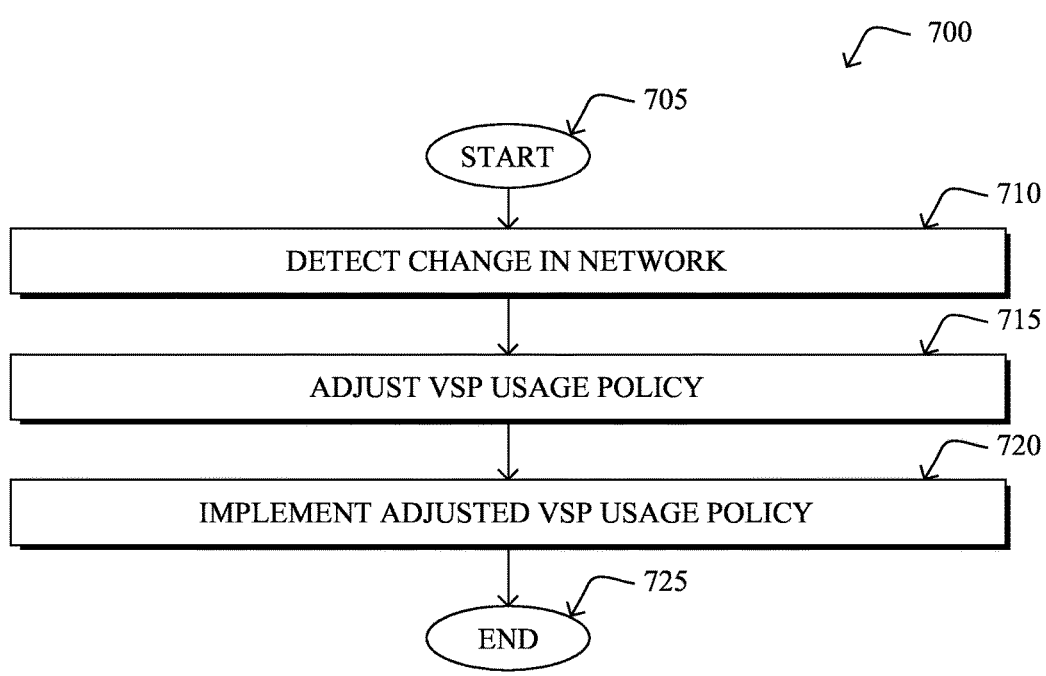
FIG. 7 illustrates an example simplified procedure for dynamically adjusting a VSP usage policy.

Referring now to FIG. 7, an example simplified procedure for dynamically adjusting a VSP usage policy is shown, according to various embodiments. As shown, procedure 700 may be implemented by a device (e.g., device 200) by executing an exemplary VSP usage policy process (e.g., process 248). Procedure 700 may begin at step 705 and continue on to step 710 where, as described in greater detail above, the device may detect a change in the network. In general, any change in the operational state of the network or its operating parameters may trigger an adjustment to an in-place VSP usage policy. For example, such a change may correspond to a change in a network metric, traffic pattern, measured performance, VSP availability or other VSP characteristics (e.g., metrics, available services, etc.), constraint received from a user interface (e.g., a revised budget, desired level of performance, etc.), detected network event (e.g., a detected traffic anomaly, etc.), combinations thereof, or the like.

At step 715, the device may adjust the VSP usage policy based on the detected change in the network, in some embodiments. For example, if a new VSP becomes available and offers similar or better performance and services as a preferred VSP in the current VSP usage policy, the device may update the policy to cause traffic to be routed via the other VSP. In another example, if a traffic anomaly is detected, the VSP usage policy may be updated to cause the traffic to be routed through a VSP that performs security-related functions.

At step 720, the device may cause the adjusted VSP usage policy to be implemented in the network, as described in greater detail above. In one embodiment, the device may begin enforcing the adjusted VSP usage policy for certain traffic received by the device. In another embodiment, the device may provide the adjusted VSP usage policy to one or more devices in the network, such as one or more routers. In response, the one or more routers or other devices may begin sending traffic in the network via one or more VSPs (e.g., through VPN tunnels to the VSPs), in accordance with the adjusted VSP usage policy. Procedure 700 then ends at step 725.

It should be noted that while certain steps within procedures 600-700 may be optional as described above, the steps shown in FIGS. 600-700 are merely examples for illustration and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, allow for the automatic generation and/or adjustment of a VSP usage policy, in contrast to static contractual relationships with one or more VSPs. In some aspects, the techniques herein may be used to "right-size" the usage of engaged VSPs and provide for options of tiered services. Notably, the techniques herein may allow a VSP to be engaged or disengaged in a dynamic manner based on network conditions (e.g., changes in traffic volume or network functions, time of day, etc.) and/or any specified constraints for the usage of VSPs.

While there have been shown and described illustrative embodiments that provide for the brokering of VSP usage in a computing network, it is to be understood that various other adaptations and modifications may be made within the spirit and scope of the embodiments herein. For example, the techniques herein may be adapted for use with traffic encapsulated within any number of tunnels and/or using any number of different tunneling techniques. Additionally, the protocols discussed herein are exemplary only and other protocols may be used within the scope of the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   determining, by a device in a network, one or more network metrics regarding operation of the network;
   determining, by the device, one or more policy constraints regarding the routing of network traffic from a first routing domain through a virtual service platform (VSP) to a second routing domain;
   dynamically generating, by the device, a VSP usage policy based on the one or more network metrics and on the one or more policy constraints, wherein the VSP usage policy is operable to cause traffic in the network to be routed through a particular VSP that is selected based on the VSP usage policy, wherein the VSP is in between the first routing domain and the second routing domain;
   controlling, by the device, a router to route traffic through the particular VSP that is selected by the device based on the VSP usage policy by establishing a virtual private network (VPN) tunnel to the VSP;
   detecting, by the device, a change in the network;
   adjusting, by the device, the VSP usage policy based on the detected change;
   causing, by the device, the adjusted VSP usage policy to be implemented in the network, wherein the adjusted VSP usage policy is operable to cause the traffic to be routed through a different VSP than the particular VSP; and
   providing, by the device, a wireless service provider policy to a router, wherein the wireless service provider policy is operable to cause the router to use a particular wireless service provider to send the traffic.

2. The method as in claim 1, wherein the one or more policy constraints comprise at least one of: a geographic region associated with the particular VSP; an operator of the particular VSP; a time period associated with the particular VSP, or a type of traffic associated with the particular VSP.

3. The method as in claim 2, wherein determining the one or more policy constraints comprises:
   receiving, at the device, the one or more policy constraints from a user interface.

4. The method as in claim 1, wherein the VSP usage policy is operable to cause the router to route traffic through the particular VSP based on at least one of: a time of day, a geographic location associated with the traffic, in response to detecting an anomaly in the traffic, a source or destination of the traffic, or a type associated with the traffic.

5. The method as in claim 1, wherein causing the VSP usage policy to be implemented in the network comprises:
   providing, by the device, the VSP usage policy to a router.

6. The method as in claim 1, wherein the one or more network metrics comprise at least one of: a bandwidth, a variation in the bandwidth, a traffic volume, or a data usage cost.

7. The method as in claim 1, wherein the particular VSP is operable to perform a service for the traffic comprising at least one of: content caching, traffic analytics, or a security operation on the traffic.

8. An apparatus, comprising:
   one or more network interfaces to communicate with a computer network;
   a processor coupled to the one or more network interfaces and configured to execute a process; and
   a memory configured to store the process executable by the processor, the process when executed operable to:
      determine one or more network metrics regarding operation of the network;
      determine one or more policy constraints regarding the routing of network traffic from a first routing domain through a virtual service platform (VSP) to a second routing domain;
      dynamically generate a VSP usage policy based on the one or more network metrics and on the one or more policy constraints, wherein the VSP usage policy is operable to cause traffic in the network to be routed through a particular VSP that is selected based on the VSP usage policy, wherein the VSP is in between the first routing domain and the second routing domain;
      control a router to route traffic through the particular VSP that is selected by the device based on the VSP usage policy by establishing a virtual private network (VPN) tunnel to the VSP;
      detect a change in the network;
      adjust the VSP usage policy based on the detected change;
      cause the adjusted VSP usage policy to be implemented in the network, wherein the adjusted VSP usage policy is operable to cause the traffic to be routed through a different VSP than the particular VSP; and
      provide a wireless service provider policy to a router, wherein the wireless service provider policy is operable to cause the router to use a particular wireless service provider to send the traffic.

9. The apparatus as in claim 8, wherein the one or more policy constraints comprise at least one of: a geographic region associated with the particular VSP; an operator of the particular VSP; a time period associated with the particular VSP, or a type of traffic associated with the particular VSP.

10. The apparatus as in claim 9, wherein the apparatus determines the one or more policy constraints by receiving the one or more policy constraints from a user interface.

11. The apparatus as in claim 8, wherein the VSP policy is operable to cause the router to route traffic through the particular VSP based on at least one of: a time of day, a geographic location associated with the traffic, in response to detecting an anomaly in the traffic, a source or destination of the traffic, or a type associated with the traffic.

12. The apparatus as in claim 8, wherein the apparatus causes a router to implement the VSP usage policy by providing the VSP policy to the router.

13. The apparatus as in claim 8, wherein the one or more network metrics comprise at least one of: a bandwidth, a variation in the bandwidth, a traffic volume, or a data usage cost.

14. The apparatus as in claim 8, wherein the particular VSP is operable to perform a service for the traffic comprising at least one of: content caching, traffic analytics, or a security operation on the traffic.

15. A tangible, non-transitory, computer-readable media having software encoded thereon, the software when executed by a processor on a device in a computer network operable to:

determine one or more network metrics regarding operation of the network;
  determine one or more policy constraints regarding the routing of network traffic from a first routing domain through a virtual service platform (VSP) to a second routing domain;
  dynamically generate a VSP usage policy based on the one or more network metrics and on the one or more policy constraints, wherein the VSP usage policy is operable to cause traffic in the network to be routed through a particular VSP that is selected based on the VSP usage policy, wherein the VSP is in between the first routing domain and the second routing domain;
  control a router to route traffic through the particular VSP that is selected by the device based on the VSP usage policy by establishing a virtual private network (VPN) tunnel to the VSP;
  detect a change in the network;
  adjust the VSP usage policy based on the detected change;
  cause the adjusted VSP usage policy to be implemented in the network, wherein the adjusted VSP usage policy is operable to cause the traffic to be routed through a different VSP than the particular VSP; and
  provide a wireless service provider policy to a router, wherein the wireless service provider policy is operable to cause the router to use a particular wireless service provider to send the traffic.

16. The computer-readable media as in claim 15, wherein the VSP policy is operable to cause the router to route traffic through the particular VSP based on at least one of: a time of day, a geographic location associated with the traffic, in response to detecting an anomaly in the traffic, a source or destination of the traffic, or a type associated with the traffic.

* * * * *